United States Patent
Park et al.

(10) Patent No.: US 11,508,961 B2
(45) Date of Patent: Nov. 22, 2022

(54) METHOD OF PREPARING POSITIVE ELECTRODE ACTIVE MATERIAL FOR SECONDARY BATTERY

(71) Applicant: LG Chem, Ltd., Seoul (KR)

(72) Inventors: Sung Bin Park, Daejeon (KR); Wang Mo Jung, Daejeon (KR); Dong Hun Lee, Daejeon (KR); Ji Hye Kim, Daejeon (KR); Dong Hwi Kim, Daejeon (KR); Hyung Man Cho, Daejeon (KR); Jung Min Han, Daejeon (KR)

(73) Assignee: LG Energy Solution, Ltd.

( * ) Notice: Subject to any disclaimer, the term of this patent is extended or adjusted under 35 U.S.C. 154(b) by 335 days.

(21) Appl. No.: 16/762,363

(22) PCT Filed: Nov. 13, 2018

(86) PCT No.: PCT/KR2018/013852
§ 371 (c)(1),
(2) Date: May 7, 2020

(87) PCT Pub. No.: WO2019/093869
PCT Pub. Date: May 16, 2019

(65) Prior Publication Data
US 2020/0266439 A1    Aug. 20, 2020

(30) Foreign Application Priority Data

Nov. 13, 2017  (KR) .......................... 10-2017-0150535
Nov. 13, 2018  (KR) .......................... 10-2018-0139154

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ..... C01G 53/44; C01G 53/50; C01P 2002/52; C01P 2006/40; H01M 10/0525;
(Continued)

(56) References Cited

U.S. PATENT DOCUMENTS

2008/0131780 A1    6/2008  Kawasato et al.
2010/0227221 A1    9/2010  Chang et al.
(Continued)

FOREIGN PATENT DOCUMENTS

CN    106848470 A    6/2017
CN    107180950 A    9/2017
(Continued)

OTHER PUBLICATIONS

International Search Report from Application No. PCT/KR2018/013852 dated Apr. 11, 2019, 2 pages.
(Continued)

*Primary Examiner* — Mark Kopec
*Assistant Examiner* — Jaison P Thomas
(74) *Attorney, Agent, or Firm* — Lerner, David, Littenberg, Krumholz & Mentlik, LLP

(57) ABSTRACT

A method of preparing a positive electrode active material for a secondary battery includes preparing a positive electrode active material precursor including nickel (Ni), cobalt (Co), and at least one selected from the group consisting of manganese (Mn) and aluminum (Al); and forming a lithium composite transition metal oxide by mixing the positive electrode active material precursor and a lithium source and performing calcination, wherein the positive electrode active material precursor includes nickel (Ni) in an amount of 60
(Continued)

mol % or more out of the entire metal element, and a molar ratio (Li/M) of lithium (Li) of the lithium source to the entire metal element (M) of the positive electrode active material precursor is greater than 1.1.

9 Claims, 1 Drawing Sheet

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2006/40* (2013.01); *H01M 2004/028* (2013.01)

(58) Field of Classification Search
CPC ........... H01M 2004/028; H01M 4/505; H01M 4/525; Y02E 60/10
See application file for complete search history.

(56) References Cited

U.S. PATENT DOCUMENTS

| | | | |
|---|---|---|---|
| 2012/0034516 A1 | 2/2012 | Koo et al. | |
| 2015/0069293 A1 | 3/2015 | Park et al. | |
| 2017/0110726 A1* | 4/2017 | Aida | H01M 4/505 |
| 2017/0125809 A1* | 5/2017 | Kim | H01M 50/107 |
| 2017/0133668 A1* | 5/2017 | Kim | C01G 53/50 |
| 2018/0145319 A1* | 5/2018 | Kim | C01G 51/00 |
| 2019/0074513 A1* | 3/2019 | Ham | H01M 4/505 |

FOREIGN PATENT DOCUMENTS

| | | | |
|---|---|---|---|
| JP | 2010064944 A | 3/2010 | |
| JP | 2011181527 A | 9/2011 | |
| JP | 2012109190 A | 6/2012 | |
| JP | 2015191844 A | 11/2015 | |
| KR | 20070082900 A | 8/2007 | |
| KR | 101056714 B1 | 8/2011 | |
| KR | 20130059029 A | 6/2013 | |
| KR | 20150043274 A | 4/2015 | |
| KR | 20160083616 A | 7/2016 | |
| WO | 2016108385 A1 | 7/2016 | |
| WO | WO-2020044652 A1 * | 3/2020 | C01G 53/00 |

OTHER PUBLICATIONS

Duan, J. et al., "Enhanced compacting density and cycling performance of Ni-riched electrode via building mono dispersed micron scaled morphology," Journal of Alloys and Compounds, Oct. 2016, pp. 91-99, vol. 695, ElSevier.
Search Report dated Jan. 29, 2022 from the Office Action for Chinese Application No. 201880073121.5 dated Feb. 11, 2022, 3 pages.
Zhangzong, C. et al., "Preparation of LiNi0.80Co0.15Al0.05O2 cathode material via Li-rich method," Energy Storage Science and Technology, Nov. 2014, pp. 620-623, vol. 3, No. 6. [English Translation of Abstract only].

* cited by examiner

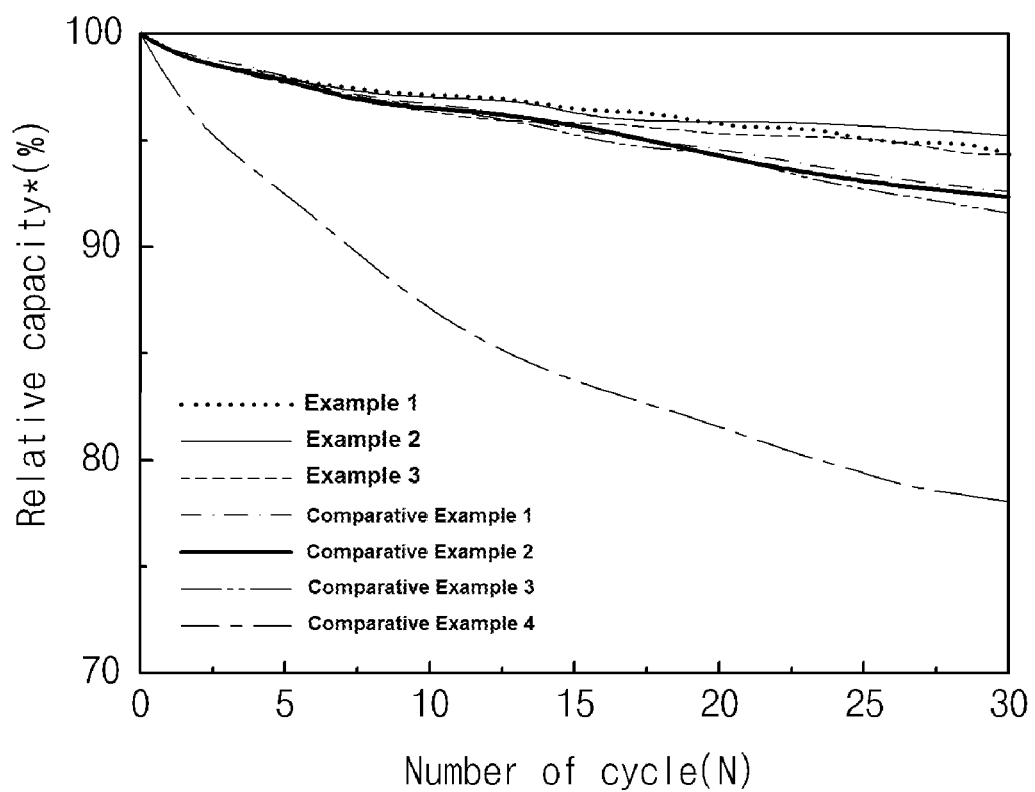

METHOD OF PREPARING POSITIVE ELECTRODE ACTIVE MATERIAL FOR SECONDARY BATTERY

CROSS-REFERENCE TO RELATED APPLICATION

This application is a national phase entry under 35 U.S.C. § 371 of International Application No. PCT/KR2018/013852, filed Nov. 13, 2018, which claims priority to Korean Patent Application No. 10-2017-0150535, filed Nov. 13, 2017, and Korean Patent Application No. 10-2018-0139154, filed Nov. 13, 2018, the disclosures of which are incorporated herein by reference.

TECHNICAL FIELD

The present invention relates to a method of preparing a positive electrode active material for a secondary battery.

BACKGROUND ART

With the recent rapid spread of electronic devices using a battery, such as mobile phones, notebook computers, electric vehicles, and the like, the demand for small, lightweight, and relatively-high-capacity secondary batteries is rapidly increasing. In particular, lithium secondary batteries have entered the spotlight as a driving power source of portable electronic devices due to their light weight and high energy density. Accordingly, research and development for enhancing the performance of the lithium secondary battery has been actively conducted.

The lithium secondary battery, in which an organic electrolyte or a polymer electrolyte is filled between a positive electrode and a negative electrode composed of an active material capable of intercalation and deintercalation of lithium ions, produces electrical energy via reduction and oxidation reactions accompanied when lithium ions are intercalated/deintercalated from the positive electrode and the negative electrode.

As a positive electrode active material of the lithium secondary battery, a lithium cobalt oxide ($LiCoO_2$), a lithium nickel oxide ($LiNiO_2$), a lithium manganese oxide ($LiMnO_2$, $LiMn_2O_4$, etc.), a lithium iron phosphate compound ($LiFePO_4$), etc. have been used. In addition, in order to improve low thermal stability while maintaining excellent reversible capacity of a lithium nickel oxide ($LiNiO_2$), a lithium composite metal oxide (hereinafter, simply referred to as "NCM-based lithium composite transition metal oxide" or "NCA-based lithium composite transition metal oxide") prepared by substituting some of nickel (Ni) with cobalt (Co) or manganese (Mn)/aluminum (Al) has been developed. However, the conventionally developed NCM-based/NCA-based lithium composite transition metal oxide has limited application due to its insufficient capacity characteristic.

In order to resolve this problem, a study focusing on increasing an amount of nickel (Ni) contained in the NCM-based/NCA-based lithium oxide has recently been conducted. However, in the case of a Ni-rich NCM-based/NCA-based lithium oxide where it is required to form nickel (Ni) having an initial oxidation number of +3, there is a difficulty in which calcination conditions such as a calcination temperature, a calcination atmosphere, and the like need to be strictly controlled because nickel (Ni) tends to maintain an oxidation number of +2. In addition, as the content of nickel (Ni) increases, crystals grow rapidly during calcination, making it difficult to control the crystal size, and since structural stability and chemical stability of a positive electrode active material are degraded, there is a limitation in improving the capacity and lifetime characteristic of a battery.

DISCLOSURE

Technical Problem

The present invention is directed to providing a method of preparing a positive electrode active material for a secondary battery, which is capable of easily increasing the degree of calcination by relieving sensitivity to calcination conditions such as a calcination temperature, a calcination atmosphere, and the like in the preparation of a positive electrode active material using a Ni-rich lithium composite transition metal oxide containing nickel (Ni) in an amount of 60 mol % or more in order to ensure high capacity, and capable of enhancing structural stability and chemical stability of the resultant positive electrode active material.

Technical Solution

According to an embodiment of the present invention, there is provided a method of preparing a positive electrode active material for a secondary battery, which includes preparing a positive electrode active material precursor including nickel (Ni), cobalt (Co), and at least one selected from the group consisting of manganese (Mn) and aluminum (Al); and forming a lithium composite transition metal oxide by mixing the positive electrode active material precursor and a lithium source and performing calcination, wherein the positive electrode active material precursor includes nickel (Ni) in an amount of 60 mol % or more out of the entire metal element, and a molar ratio (Li/M) of lithium (Li) of the lithium source to the entire metal element (M) of the positive electrode active material precursor is greater than 1.1.

Advantageous Effects

According to the present invention, sensitivity to calcination conditions such as a calcination temperature, a calcination atmosphere, and the like is relieved in the preparation of a positive electrode active material using a Ni-rich lithium composite transition metal oxide containing nickel (Ni) in an amount of 60 mol % or more in order to ensure high capacity, so that the degree of calcination can easily increase without the difficulty of strictly controlling calcination conditions.

In addition, although the positive electrode active material according to the present invention is prepared using a Ni-rich lithium composite transition metal oxide, a crystal size can be easily controlled, and the structural stability and chemical stability thereof can be enhanced.

Additionally, a lithium secondary battery fabricated using the positive electrode active material prepared according to the present invention can exhibit improved initial capacity, efficiency, and lifetime characteristics.

DESCRIPTION OF DRAWINGS

The FIGURE is a graph illustrating evaluation of the cycle characteristic of lithium secondary batteries using positive electrode active materials prepared according to Examples and Comparative Examples.

MODE FOR INVENTION

Hereinafter, the present invention will be described in more detail to promote understanding of the present invention. Terms and words used in this specification and claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

A method of preparing a positive electrode active material for a secondary battery according to the present invention includes (1) preparing a positive electrode active material precursor including nickel (Ni), cobalt (Co), and at least one selected from the group consisting of manganese (Mn) and aluminum (Al); and (2) forming a lithium composite transition metal oxide by mixing the positive electrode active material precursor and a lithium source and performing calcination, wherein the positive electrode active material precursor includes nickel (Ni) in an amount of 60 mol % or more out of the entire metal element, and a molar ratio (Li/M) of lithium (Li) of the lithium source to the entire metal element (M) of the positive electrode active material precursor is greater than 1.1.

According to the present invention, in the preparation of a positive electrode active material using a Ni-rich lithium composite transition metal oxide containing nickel (Ni) in an amount of 60 mol % or more in order to ensure high capacity, the sensitivity to calcination conditions such as a calcination temperature, a calcination atmosphere, and the like is relieved by adjusting a molar ratio (Li/M) of lithium (Li) of the lithium source to the entire metal element (M) of the positive electrode active material precursor to exceed 1.1, so that the degree of calcination may easily increase without the difficulty of strictly controlling calcination conditions.

Although a positive electrode active material is prepared using a Ni-rich lithium composite transition metal oxide according to the present invention, a crystal size may be easily controlled, and the structural stability and chemical stability thereof may be enhanced.

In addition, a lithium secondary battery fabricated using the positive electrode active material prepared according to the present invention may exhibit improved initial capacity, efficiency, and lifetime characteristics.

Each step of the method of preparing a positive electrode active material will be described in detail.

First, in step (1), a positive electrode active material precursor including nickel (Ni), cobalt (Co), and at least one selected from the group consisting of manganese (Mn) and aluminum (Al) is prepared.

In the present invention, the positive electrode active material precursor is a Ni-rich positive electrode active material precursor containing nickel (Ni) in an amount of 60 mol % or more out of the entire metal element, more preferably, in an amount of 80 mol % or more out of the entire metal element. As in the present invention, a lithium composite transition metal oxide prepared using a Ni-rich positive electrode active material precursor containing nickel (Ni) in an amount of 60 mol % or more out of the entire metal element may ensure high capacity.

More specifically, the positive electrode active material precursor may be represented by Chemical Formula 1 below.

$$Ni_{1-(x1+y1+z1)}Co_{x1}M^a_{y1}M^b_{z1}(OH)_2 \quad \text{[Chemical Formula 1]}$$

In Chemical Formula 1, $M^a$ is at least one element selected from the group consisting of Mn and Al, $M^b$ is at least one element selected from the group consisting of Zr, W, Mg, Al, Ce, Hf, Ta, La, Ti, Sr, Ba, Nb, Mo, and Cr, $0<x1\leq0.4$, $0<y1\leq0.4$, $0\leq z1\leq0.1$, and $0<x1+y1+z1\leq0.4$.

In the positive electrode active material precursor represented by Chemical Formula 1, Ni may be included in an amount of $1-(x1+y1+z1)$, for example, $0.6\leq1-(x1+y1+z1)<1$. When the content of Ni in the positive electrode active material precursor represented by Chemical Formula 1 is 0.6 or more, a Ni amount sufficient to contribute to charging and discharging is ensured, and thus high capacity may be realized. More preferably, Ni may be included in an amount of $0.8\leq1-(x1+y1+z1)\leq0.99$. As such, since the positive electrode active material precursor used in the present invention is a Ni-rich compound containing nickel (Ni) in an amount of 60 mol % or more out of the entire metal element, which exhibits high sensitivity to calcination conditions such as a calcination temperature, a calcination atmosphere, and the like and has a greater difficulty in forming a positive electrode active material which ensures structural stability and chemical stability compared to a case where nickel (Ni) is included in an amount of less than 60 mol %, it is more important to increase the degree of calcination by controlling calcination conditions.

In the positive electrode active material precursor represented by Chemical Formula 1, Co may be included in an amount of x1, that is, $0<x1\leq0.4$. When the content of Co in the positive electrode active material precursor represented by Chemical Formula 1 is greater than 0.4, costs may increase. Considering that the inclusion of Co has the effect of remarkably improving a capacity characteristic, Co may be included in an amount of, more specifically, $0.05\leq x1\leq0.2$.

In the positive electrode active material precursor represented by Chemical Formula 1, $M^a$ may be Mn or Al, or Mn and Al. These metal elements may enhance the stability of an active material, and accordingly may improve the stability of a battery. In consideration of the effect of improving a lifetime characteristic, $M^a$ may be included in an amount of y1, that is, $0<y1\leq0.4$. When y1 in the positive electrode active material precursor represented by Chemical Formula 1 is greater than 0.4, the output characteristic and capacity characteristic of a battery may rather be deteriorated. $M^a$ may be included in an amount of, more specifically, $0.05\leq y1\leq0.2$.

In the positive electrode active material precursor represented by Chemical Formula 1, $M^b$ may be a doping element included in the positive electrode active material precursor and may be included in an amount of z1, that is, $0\leq z1\leq0.1$.

The positive electrode active material precursor used in the present invention may be a NCM-based compound including nickel (Ni), cobalt (Co), and manganese (Mn) or a NCA-based compound including nickel (Ni), cobalt (Co), and aluminum (Al). Also, the positive electrode active material precursor may be a quaternary positive electrode active material precursor essentially including four components: nickel (Ni), cobalt (Co), manganese (Mn), and aluminum (Al). In the aspect of capacity, efficiency, and lifetime characteristics, a NCM-based compound including nickel (Ni), cobalt (Co), and manganese (Mn) or a quaternary positive electrode active material precursor essentially including four components, nickel (Ni), cobalt (Co), manganese (Mn), and aluminum (Al), would be more preferred.

When a positive electrode active material is prepared using the quaternary positive electrode active material precursor, the stability of the positive electrode active material may be enhanced, and a battery life may be enhanced without deteriorating an output characteristic and a capacity characteristic compared to when a positive electrode active material is prepared using a NCM/NCA-based positive electrode active material.

Subsequently, in step (2), the positive electrode active material precursor and a lithium source are mixed and calcined to form a lithium composite transition metal oxide. In this case, according to the present invention, the positive electrode active material precursor and the lithium source are mixed in such a way that a molar ratio (Li/M) of lithium (Li) of the lithium source to the entire metal element (M) of the positive electrode active material precursor is greater than 1.1.

The lithium source may be lithium-containing sulfate, nitrate, acetate, carbonate, oxalate, citrate, halide, hydroxide, oxyhydroxide, etc., and is not particularly limited as long as it can be dissolved in water. Specific examples of the lithium source include $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$, $Li_3C_6H_5O_7$, etc., and these compounds may be used alone or in combination of two or more thereof.

Conventionally, a molar ratio (Li/M) of lithium (Li) of the lithium source to the entire metal element (M) of the positive electrode active material precursor is generally set to about 1.02 to 1.05. In this case, the sensitivity to calcination conditions such as a calcination temperature, a calcination atmosphere, and the like is high; therefore, when calcination conditions are not controlled appropriately or not satisfied with a slight deviation, there is a difficulty in forming nickel (Ni) having an initial oxidation number of +3 due to the tendency of nickel (Ni) to maintain an oxidation number of +2 and ensuring the required degree of calcination due to a rapid increase in crystal size and the like. Also, when the degree of calcination is decreased, it is not possible to realize a sufficiently high capacity.

In order to resolve these problems, in the preparation of a positive electrode active material using a Ni-rich lithium composite transition metal oxide containing nickel (Ni) in an amount of 60 mol % or more in the present invention, the sensitivity to calcination conditions such as a calcination temperature, a calcination atmosphere, and the like is relieved by adjusting a molar ratio (Li/M) of lithium (Li) of the lithium source to the entire metal element (M) of the positive electrode active material precursor to exceed 1.1, so that the degree of calcination may easily increase without the difficulty of strictly controlling calcination conditions. In addition, although a positive electrode active material is prepared using a Ni-rich lithium composite transition metal oxide according to the present invention, a crystal size may be easily controlled, and the structural stability and chemical stability may be enhanced. Based on the facts, it can be confirmed that a positive electrode active material capable of stably realizing high capacity may be prepared.

When a molar ratio (Li/M) of lithium (Li) of the lithium source to the entire metal element (M) of the positive electrode active material precursor is 1.1 or less, it is very difficult to control the calcination conditions for increasing the degree of calcination and is also difficult to control a crystal size. Accordingly, a positive electrode active material which realizes high capacity and ensures stability may not be easily prepared.

More preferably, a molar ratio (Li/M) of lithium (Li) of the lithium source to the entire metal element (M) of the positive electrode active material precursor may be 1.105 to 1.30, further more preferably, 1.13 to 1.20.

The calcination may be carried out at a calcination temperature of 700 to 900° C., more preferably, 750 to 850° C.

In addition, the calcination may be carried out while raising a temperature to the calcination temperature at a temperature elevation rate of 2 to 10° C./min, more preferably, 3 to 7° C./min.

Additionally, the calcination may be carried out under an oxygen atmosphere, and, more specifically, may be carried out at the above-described calcination temperature under an oxygen atmosphere for 5 to 30 hours.

Subsequently, the method may further include, after the formation of a Ni-rich lithium composite transition metal oxide as described above, washing the lithium composite transition metal oxide to remove a residual lithium by-product.

In the case of the Ni-rich lithium composite transition metal oxide, the amount of a lithium by-product remaining in the form of LiOH and $Li_2CO_3$ on a surface of the positive electrode active material increases, and this may lead to the generation of gas and the occurrence of a swelling phenomenon. Therefore, the washing process may be performed to remove a residual lithium by-product.

The washing process may be performed, for example, by adding the lithium composite transition metal oxide to pure water and stirring the same. In this case, pure water may be used in an amount of 30 to 300 parts by weight, more preferably, 50 to 150 parts by weight, with respect to 100 parts by weight of the lithium composite transition metal oxide.

In addition, the washing process may be performed at a temperature of 30° C. or less, preferably, −10° C. to 30° C. for a time of about 10 minutes to 1 hour. When the temperature and duration of the washing process fall within the above ranges, a lithium by-product may be effectively removed.

According to the present invention, since the lithium source is added in such a way that a molar ratio (Li/M) of lithium (Li) of the lithium source to the entire metal element (M) of the positive electrode active material precursor is greater than 1.1, the amount of a residual lithium by-product may increase. However, the residual lithium by-product may not be much of an issue because it may be removed through such a washing process.

As such, the positive electrode active material prepared using a lithium composite transition metal oxide according to the present invention is a Ni-rich lithium composite transition metal oxide containing nickel (Ni) in an amount of 60 mol % or more, and may realize high capacity due to an enhanced degree of calcination, and may exhibit enhanced structural stability and chemical stability. In addition, a lithium secondary battery fabricated using the positive electrode active material prepared according to the present invention may exhibit enhanced initial capacity, efficiency, and lifetime characteristics.

According to another embodiment of the present invention, there are provided a positive electrode for a lithium secondary battery and a lithium secondary battery, which include the positive electrode active material prepared as described above.

Specifically, the positive electrode includes a positive electrode current collector and a positive electrode active material layer formed on the positive electrode current collector and including the above-described positive electrode active material.

In the positive electrode, the positive electrode current collector is not particularly limited as long as it does not cause a chemical change in the battery and has conductivity. For example, the positive electrode current collector may be stainless steel, aluminum, nickel, titanium, calcined carbon, or aluminum or stainless steel whose surface is treated with carbon, nickel, titanium, silver, or the like. Also, the positive electrode current collector may be generally prepared with a thickness of 3 to 500 μm, and may have fine irregularities at a surface thereof to increase adhesion with the positive electrode active material. In addition, the positive electrode current collector may be used in any of various forms such as a film, a sheet, a foil, a net, a porous material, a foam, a non-woven fabric, and the like.

In addition, the positive electrode active material layer may include a conductive material and a binder in addition to the above-described positive electrode active material.

The conductive material is used for imparting conductivity to an electrode, and is not particularly limited as long as it does not cause a chemical change in the battery and has electron conductivity. Specific examples of the conductive material include graphite such as natural graphite, artificial graphite, etc.; carbonaceous materials such as carbon black, acetylene black, Ketjen black, channel black, furnace black, lamp black, thermal black, carbon fiber, etc.; powders or fibers of metals such as copper, nickel, aluminum, silver, etc.; conductive whiskers such as zinc oxide, potassium titanate, etc.; conductive metal oxides such as titanium oxide, etc.; and conductive polymers such as polyphenylene derivatives, etc. These compounds may be used alone or in combination of two or more thereof. The conductive material may be generally included in an amount of 1 to 30 wt % with respect to the total weight of the positive electrode active material layer.

The binder serves to increase adhesion between positive electrode active material particles and adhesive strength between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene polymer (EPDM), a sulfonated EPDM, styrene-butadiene rubber (SBR), fluororubber, various copolymers thereof, etc. These compounds may be used alone or in combination of two or more thereof. The binder may be included in an amount of 1 wt % to 30 wt % with respect to the total weight of the positive electrode active material layer.

The positive electrode may be manufactured according to a general positive electrode manufacturing method except for use of the above-described positive electrode active material. Specifically, the positive electrode may be manufactured by applying a composition for forming a positive electrode active material layer including the above-described positive electrode active material and, optionally, a binder and a conductive material on a positive electrode current collector, followed by drying and rolling. In this case, the types and contents of the positive electrode active material, the binder, and the conductive material are the same as described above.

The solvent may be a solvent generally used in the art. Specific examples of the solvent include dimethyl sulfoxide (DMSO), isopropyl alcohol, N-methyl pyrrolidone (NMP), acetone, water, and the like, and these compounds may be used alone or in combination of two or more thereof. The solvent is used in an amount just enough to have the degree of viscosity which enables the positive electrode active material, the conductive material, and the binder to be dissolved or dispersed and later results in excellent uniformity of a thickness upon application for manufacturing a positive electrode, in consideration of a thickness of an applied slurry and manufacturing yield.

Alternatively, as another method, the positive electrode may be manufactured by casting the composition for forming a positive electrode active material layer on a separate support and then laminating a film obtained by peeling off from the support on a positive electrode current collector.

According to still another embodiment of the present invention, there is provided an electrochemical device including the above-described positive electrode. The electrochemical device may be, specifically, a battery, a capacitor, or the like, more specifically, a lithium secondary battery.

The lithium secondary battery includes, specifically, a positive electrode, a negative electrode provided to face the positive electrode, a separator interposed between the positive electrode and the negative electrode, and an electrolyte, and the positive electrode is the same as described above. Also, the lithium secondary battery may optionally further include a battery container accommodating an electrode assembly of the positive electrode, the negative electrode, and the separator and a sealing member for sealing the battery container.

In the lithium secondary battery, the negative electrode includes a negative electrode current collector and a negative electrode active material layer disposed on the negative electrode current collector.

The negative electrode current collector is not particularly limited as long as it does not cause a chemical change in the battery and has high conductivity. For example, the negative electrode current collector may be copper, stainless steel, aluminum, nickel, titanium, calcined carbon, or copper or stainless steel whose surface is treated with carbon, nickel, titanium, silver, or the like, an aluminum-cadmium alloy, or the like. Also, the negative electrode current collector may be generally prepared with a thickness of 3 to 500 μm, and, like the positive electrode current collector, may have fine irregularities at a surface thereof to increase adhesion with the negative electrode active material. For example, the negative electrode current collector may be used in any of various forms such as a film, a sheet, a foil, a net, a porous material, a foam, a non-woven fabric, and the like.

The negative electrode active material layer may optionally include a binder and a conductive material in addition to the negative electrode active material. The negative electrode active material layer may be prepared, for example, by applying, on the negative electrode current collector, a composition for forming a negative electrode including a negative electrode active material, and, optionally, a binder and a conductive material and drying the composition; or by casting the composition for forming a negative electrode on a separate support and then laminating a film obtained by peeling off from the support on a negative electrode current collector.

The negative electrode active material may be a compound capable of reversible intercalation and deintercalation of lithium ions. Specific examples of the negative electrode active material include carbonaceous materials such as artificial graphite, natural graphite, graphitized carbon fiber, amorphous carbon, etc.; metallic compounds capable of alloying with lithium, such as Si, Al, Sn, Pb, Zn, Bi, In, Mg, Ga, Cd, a Si alloy, a Sn alloy, an Al alloy, etc.; metal oxides capable of doping and dedoping lithium, such as $SiO_\alpha$, ($0<\alpha<2$), $SnO_2$, vanadium oxide, and lithium vanadium oxide; and composites including the metallic compound and the carbonaceous material, such as a Si—C composite and a Sn—C composite. These compounds may be used alone or in combination of two or more thereof. In addition, a lithium metal thin-film may be used as the negative electrode active material. Additionally, low-crystallinity carbon, high-crystallinity carbon, and the like all may be used as the carbonaceous material. Representative examples of the low-crystallinity carbon include soft carbon and hard carbon, and representative examples of the high-crystallinity carbon include amorphous, platy, scaly, spherical, or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes and the like.

In addition, the binder and the conductive material may be the same as described above for the positive electrode.

In the lithium secondary battery, the separator serves to separate the negative electrode and the positive electrode and provide a flow path for lithium ions. The separator is not particularly limited as long as it is used as a separator in a common lithium secondary battery, and, in particular, a separator which exhibits low resistance to migration of electrolyte ions and has an excellent electrolyte solution impregnation ability is preferred. Specifically, the separator may be a porous polymer film made of a polyolefin-based polymer such as an ethylene homopolymer, a propylene homopolymer, an ethylene/butene copolymer, an ethylene/hexene copolymer, an ethylene/methacrylate copolymer, etc., or a stacked structure having two or more layers made thereof. In addition, the separator may be a common porous non-woven fabric, for example, a non-woven fabric made of glass fiber with a high melting point, polyethylene terephthalate fiber, etc. Additionally, in order to ensure heat resistance or mechanical strength, the separator may be a coated separator including ceramic components or polymer materials, and optionally, may be used in a single-layer or multi-layer structure.

The electrolyte used in the present invention may be an organic liquid electrolyte, an inorganic liquid electrolyte, a solid polymer electrolyte, a gel-type polymer electrolyte, an inorganic solid electrolyte, a molten-type inorganic electrolyte, etc., which may be used in the fabrication of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specific examples of the organic solvent include ester-based solvents such as methyl acetate, ethyl acetate, γ-butyrolactone, ε-caprolactone, etc.; ether-based solvents such as dibutyl ether, tetrahydrofuran, etc.; ketone-based solvents such as cyclohexanone, etc.; aromatic hydrocarbon-based solvents such as benzene, fluorobenzene, etc.; carbonate-based solvents such as dimethyl carbonate (DMC), diethyl carbonate (DEC), methyl ethyl carbonate (MEC), ethyl methyl carbonate (EMC), ethylene carbonate (EC), propylene carbonate (PC), etc.; alcohol-based solvents such as ethyl alcohol, isopropyl alcohol, etc.; nitriles such as R—CN (R is a C2 to C20 hydrocarbon group with a linear, branched or cyclic structure and may include a double-bonded aromatic ring or an ether linkage), etc.; amides such as dimethylformamide, etc.; dioxolane such as 1,3-dioxolane, etc.; and sulfolane. Among these compounds, the carbonate-based solvent is preferred, and a mixture of a cyclic carbonate having high ionic conductivity and a high dielectric constant, which are capable of increasing the charging and discharging performance of a battery (e.g., EC, PC, etc.), and a linear carbonate-based compound with low viscosity (e.g., EMC, DMC, DEC, etc.) is more preferred. In this case, when the cyclic carbonate and chain carbonate are mixed at a volume ratio of about 1:1 to about 1:9, excellent performance of an electrolyte solution may be exhibited.

The lithium salt is not particularly limited as long as it can provide a lithium ion used in a lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, etc. The concentration of the lithium salt is preferably within 0.1 to 2.0 M. When the concentration of the lithium salt falls within the above range, the electrolyte has appropriate conductivity and viscosity, and thus excellent performance of the electrolyte may be exhibited and lithium ions may be effectively migrated.

In addition to the above-described components, for the purpose of enhancing lifespan characteristics of the battery, suppressing a decrease in battery capacity, enhancing discharge capacity of the battery, and the like, the electrolyte may further include one or more additives such as a haloalkylene carbonate-based compound such as difluoroethylene carbonate, etc., pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride, etc. In this case, the additives may be included in an amount of 0.1 to 5 wt % with respect to the total weight of the electrolyte.

As described above, since the lithium secondary battery including the positive electrode active material according to the present invention stably exhibits excellent discharge capacity, excellent output characteristics and an excellent capacity retention rate, it is useful in portable electronic devices such as mobile phones, notebook computers, digital cameras, etc. and electric vehicles such as hybrid electric vehicles (HEVs), etc.

Accordingly, according to yet another embodiment of the present invention, there are provided a battery module including the above-described lithium secondary battery as a unit cell and a battery pack including the same.

The battery module or the battery pack may be used as power sources of any one or more medium- to large-sized devices among power tools; electric vehicles including electric vehicles (EVs), HEVs, and plug-in hybrid electric vehicles (PHEVs); and a system for storing electric power.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Example 1

$Ni_{0.86}Co_{0.1}Mn_{0.02}Al_{0.02}(OH)_2$ as a positive electrode active material precursor and LiOH as a lithium source were put into a Henschel mixer (700 L) in such a way that a molar ratio (Li/M) of lithium (Li) of the lithium source to the entire metal element (M) of the positive electrode active material precursor was 1.15, and mixed at 300 central rpm for 20 minutes. The mixed powder was put into an alumina crucible with a size of 330 mm×330 mm, the temperature inside the crucible was raised at 5° C./min, and calcination was carried out under an oxygen ($O_2$) atmosphere at 790° C. for 10 hours to prepare a lithium composite transition metal oxide.

300 g of the lithium composite transition metal oxide thus prepared was put into 240 mL of 10° C. pure water, washed by stirring for 30 minutes, and filtered for 20 minutes. The lithium composite transition metal oxide thus filtered was dried in a vacuum oven at 130° C. for 10 hours to prepare a positive electrode active material.

Example 2

A positive electrode active material was prepared in the same manner as in Example 1 except that $Ni_{0.86}Co_{0.1}Mn_{0.02}Al_{0.02}(OH)_2$ as a positive electrode active material precursor and LiOH as a lithium source were put into a mixer in such a way that a molar ratio (Li/M) of lithium (Li) of the lithium source to the entire metal element (M) of the positive electrode active material precursor was 1.20.

Example 3

A positive electrode active material was prepared in the same manner as in Example 1 except that $Ni_{0.86}Co_{0.1}Mn_{0.02}Al_{0.02}(OH)_2$ as a positive electrode active material precursor and LiOH as a lithium source were put into a mixer in such a way that a molar ratio (Li/M) of lithium (Li) of the lithium source to the entire metal element (M) of the positive electrode active material precursor was 1.105.

Comparative Example 1

A positive electrode active material was prepared in the same manner as in Example 1 except that $Ni_{0.86}Co_{0.1}Mn_{0.02}Al_{0.02}(OH)_2$ as a positive electrode active material precursor and LiOH as a lithium source were put into a mixer in such a way that a molar ratio (Li/M) of lithium (Li) of the lithium source to the entire metal element (M) of the positive electrode active material precursor was 1.02.

Comparative Example 2

A positive electrode active material was prepared in the same manner as in Example 1 except that $Ni_{0.86}Co_{0.1}Mn_{0.02}Al_{0.02}(OH)_2$ as a positive electrode active material precursor and LiOH as a lithium source were put into a mixer in such a way that a molar ratio (Li/M) of lithium (Li) of the lithium source to the entire metal element (M) of the positive electrode active material precursor was 1.05.

Comparative Example 3

A positive electrode active material was prepared in the same manner as in Example 1 except that $Ni_{0.86}Co_{0.1}Mn_{0.02}Al_{0.02}(OH)_2$ as a positive electrode active material precursor and LiOH as a lithium source were put into a mixer in such a way that a molar ratio (Li/M) of lithium (Li) of the lithium source to the entire metal element (M) of the positive electrode active material precursor was 1.08.

Comparative Example 4

30 g of $Ni_{0.8}Co_{0.15}Al_{0.05}(OH)_2$ as a positive electrode active material precursor and 13.80 g of $Li_0H(H_2O)$ were mixed and calcined under an oxidizing atmosphere at 700° C. for 10 hours to obtain $Li_{1.05}Ni_{0.8}Co_{0.15}Al_{0.05}O_2$ as a positive electrode active material.

Preparation Example: Fabrication of Lithium Secondary Battery

Each of the positive electrode active materials prepared according to Examples 1 to 3 and Comparative Examples 1 to 4, carbon black as a conductive material, and PVDF as a binder were mixed in N-methyl pyrrolidone as a solvent in a weight ratio of 95:2.5:2.5 to prepare a positive electrode mixture (viscosity: 5,000 mPa·s), and the mixture was applied on one surface of an aluminum current collector, dried at 130° C., and then rolled to manufacture a positive electrode.

In addition, natural graphite as a negative electrode active material, carbon black as a conductive material, and PVDF as a binder were mixed in N-methyl pyrrolidone as a solvent in a weight ratio of 85:10:5 to prepare a composition for forming a negative electrode active material layer, and the composition was applied on one surface of a copper current collector to manufacture a negative electrode.

A porous polyethylene separator was interposed between the positive electrode and the negative electrode thus manufactured to manufacture an electrode assembly, the electrode assembly was disposed in a case, and then an electrolyte solution was injected into the inside of the case to fabricate a lithium secondary battery. In this case, the electrolyte solution was prepared by dissolving 1.0 M lithium hexafluorophosphate ($LiPF_6$) in an organic solvent composed of ethylene carbonate/dimethyl carbonate/ethyl methyl carbonate (mixing ratio of EC/DMC/EMC=3/4/3).

Experimental Example 1: Evaluation of Battery Capacity and Efficiency

The lithium secondary battery cell (full cell) fabricated using each of the positive electrode active materials prepared according to Examples 1 to 3 and Comparative Examples 1 to 4 as described above was subjected to a charging and discharging test to measure initial capacity and initial efficiency at 0.2 C, and results thereof are shown in Table 1 below.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Charge capacity (mAh/g)(0.2 C) | 230.1 | 231.2 | 230.7 | 228.4 | 229.3 | 229.6 | 221.2 |
| Discharge capacity (mAh/g)(0.2 C) | 205.4 | 205.5 | 205.7 | 202.2 | 203.4 | 203.6 | 190.2 |
| Efficiency (%)(0.2 C) | 89.3 | 88.9 | 89.2 | 88.5 | 88.7 | 88.7 | 86.0 |

* Temperature: 25° C., Loading: 420 mg/25 cm$^2$, Voltage: 4.25 V

Referring to Table 1, Examples 1 to 3, in which a molar ratio (Li/M) of lithium (Li) to a metal element (M) was greater than 1.1, exhibited slightly higher initial capacity and efficiency compared to Comparative Examples 1 to 4 in which a molar ratio (Li/M) of lithium (Li) to a metal element (M) was 1.1 or less.

Experimental Example 2: Evaluation of Lifetime Characteristic

The lithium secondary battery cell (full cell) fabricated as described above was charged at 45° C. in the CC/CV mode of 0.5C until 4.25 V was reached, cut off at 0.55C, and discharged at a constant current of 1.0C until 2.5V was reached. While performing 30 cycles of the charging and discharging, the capacity retention rate (%) of the battery was measured. Results thereof are shown in the FIGURE.

Referring to the FIGURE, it can be confirmed that Examples 1 to 3, in which a molar ratio (Li/M) of lithium (Li) to a metal element (M) was greater than 1.1, exhibited a higher capacity retention rate according to cycle number compared to Comparative Examples 1 to 4 in which a molar ratio (Li/M) of lithium (Li) to a metal element (M) was 1.1 or less. That is, it can be seen that Examples 1 to 3, in which a molar ratio (Li/M) of lithium (Li) to a metal element (M) was greater than 1.1, exhibited a significantly enhanced lifetime characteristic.

The invention claimed is:

1. A method of preparing a positive electrode active material for a secondary battery, comprising:
   preparing a positive electrode active material precursor including nickel (Ni), cobalt (Co), and at least one selected from the group consisting of manganese (Mn) and aluminum (Al); and
   forming a lithium composite transition metal oxide by mixing the positive electrode active material precursor and a lithium source and performing calcination,
   wherein the positive electrode active material precursor includes nickel (Ni) in an amount of 60 mol % or more based on a total number of moles of metal elements, and
   a molar ratio (Li/M) of lithium (Li) of the lithium source to the metal element (M) of the positive electrode active material precursor is greater than 1.1,
   wherein the positive electrode active material precursor is represented by Chemical Formula 1 below:

$$Ni_{1-(x1+y1+z1)}Co_{x1}M^a_{y1}M^b_{z1}(OH)_2 \quad \text{[Chemical Formula 1]}$$

wherein $M^a$ is at least one element selected from the group consisting of Mn and Al, $M^b$ is at least one element selected from the group consisting of Zr, W, Mg, Al, Ce, Hf, Ta, La, Ti, Sr, Ba, Nb, Mo, and Cr, and $0<x1\leq0.4$, $0<y1\leq0.4$, $0\leq z1\leq0.1$, and $0<x1+y1+z1\leq0.4$.

2. The method of claim 1, wherein the molar ratio (Li/M) is 1.105 to 1.30.

3. The method of claim 1, wherein the molar ratio (Li/M) 1.13 to 1.20.

4. The method of claim 1, wherein the positive electrode active material precursor includes nickel (Ni) in an amount of 80 mol % or more based on a total number of moles of metal elements.

5. The method of claim 1, wherein the positive electrode active material precursor includes nickel (Ni), cobalt (Co), manganese (Mn), and aluminum (Al).

6. The method of claim 1, wherein the calcination is carried out at a calcination temperature of 700 to 900° C.

7. The method of claim 1, wherein the calcination is carried out while raising a temperature to a calcination temperature at a temperature elevation rate of 2 to 10° C./min.

8. The method of claim 1, wherein the calcination is carried out under an oxygen atmosphere.

9. The method of claim 1, further comprising, washing the lithium composite transition metal oxide after the formation of a lithium composite transition metal oxide.

* * * * *